(12) United States Patent
Angevin et al.

(10) Patent No.: US 11,225,908 B2
(45) Date of Patent: Jan. 18, 2022

(54) HYDRAULIC AND PNEUMATIC CONTROL CIRCUIT HAVING A FUEL/AIR HEAT EXCHANGER FOR A TURBOJET

(71) Applicant: SAFRAN AIRCRAFT ENGINES, Paris (FR)

(72) Inventors: Thomas Roger Jacques Angevin, Alfortville (FR); Arnaud Baudran, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 176 days.

(21) Appl. No.: 16/206,262

(22) Filed: Nov. 30, 2018

(65) Prior Publication Data

US 2019/0170065 A1  Jun. 6, 2019

(30) Foreign Application Priority Data

Dec. 6, 2017 (FR) ..................................... 17 61699

(51) Int. Cl.
*F02C 7/00* (2006.01)
*F02C 7/224* (2006.01)
(Continued)

(52) U.S. Cl.
CPC .............. *F02C 7/224* (2013.01); *F01D 11/14* (2013.01); *F02C 3/04* (2013.01); *F02C 7/14* (2013.01);
(Continued)

(58) Field of Classification Search
CPC .... F02C 7/22; F02C 7/224; F02C 7/14; F02C 9/18; F02C 9/24; F15B 13/06;
(Continued)

(56) References Cited

U.S. PATENT DOCUMENTS

| 4,404,793 A | 9/1983 | Coffinberry |
| 8,534,044 B2 | 9/2013 | Smith |

(Continued)

FOREIGN PATENT DOCUMENTS

| FR | 2 478 742 | 9/1981 |
| WO | WO 2015/080778 A2 | 6/2015 |

OTHER PUBLICATIONS

French Preliminary Search Report dated Aug. 22, 2018 in French Application 17 61699, filed on Dec. 6, 2017 (with English Translation of Categories of Cited Documents & Written Opinion).

*Primary Examiner* — Edwin Kang
(74) *Attorney, Agent, or Firm* — Oblon, McClelland, Maier & Neustadt, L.L.P.

(57) ABSTRACT

A hydraulic and pneumatic control circuit for a turbojet, a main hydraulic line having an oil/fuel heat exchanger with a function of transferring heat from the oil flowing in an oil circuit of the turbojet to the fuel flowing in the main hydraulic line, the circuit having a first hydraulic line for feeding fuel to a combustion chamber of the turbojet, a second hydraulic line for feeding fuel to one or more actuators for controlling variable geometry equipment, each actuator being fed with fuel via an electrohydraulic servovalve, a pneumatic line for feeding air to a pneumatic control member for bleed valves of a compressor and a blade tip clearance control valve of a turbine of the turbojet, and a fuel/air heat exchanger positioned on the second hydraulic line upstream from the hydraulic servovalve and on the pneumatic line upstream from the pneumatic control member.

5 Claims, 2 Drawing Sheets

(51) Int. Cl.
  *F02C 9/18* (2006.01)
  *F02C 3/04* (2006.01)
  *F01D 11/14* (2006.01)
  *F02C 9/24* (2006.01)
  *F15B 13/06* (2006.01)
  *F15B 21/06* (2006.01)
  *F02C 7/14* (2006.01)

(52) U.S. Cl.
  CPC .............. *F02C 9/18* (2013.01); *F02C 9/24* (2013.01); *F15B 13/06* (2013.01); *F15B 21/06* (2013.01); *F05D 2220/32* (2013.01); *F05D 2260/213* (2013.01); *F05D 2260/601* (2013.01); *F05D 2260/605* (2013.01); *F05D 2270/64* (2013.01); *F05D 2270/65* (2013.01); *F15B 2211/426* (2013.01)

(58) Field of Classification Search
  CPC ......... F15B 2211/426; F05D 2260/213; F05D 2260/601; F05D 2270/64; F05D 2270/65; F05D 2220/32
  See application file for complete search history.

(56) References Cited

U.S. PATENT DOCUMENTS

| | | | |
|---|---|---|---|
| 9,702,301 B2 | 7/2017 | Potel et al. | |
| 2004/0194627 A1* | 10/2004 | Huang | B01D 19/0031 |
| | | | 96/6 |
| 2010/0107603 A1 | 5/2010 | Smith | |
| 2011/0252764 A1 | 10/2011 | Smith | |
| 2012/0260658 A1* | 10/2012 | Bader | F02C 7/236 |
| | | | 60/734 |
| 2013/0115055 A1* | 5/2013 | Mottet | F01D 25/00 |
| | | | 415/145 |
| 2013/0283811 A1 | 10/2013 | Potel et al. | |
| 2015/0247417 A1* | 9/2015 | Bacic | F04D 29/164 |
| | | | 415/1 |
| 2015/0252683 A1* | 9/2015 | Hasting | F01D 11/20 |
| | | | 60/782 |
| 2016/0003086 A1* | 1/2016 | Day | F01D 11/24 |
| | | | 415/136 |
| 2016/0201563 A1* | 7/2016 | Stearns | F23K 5/04 |
| | | | 60/776 |
| 2018/0038243 A1* | 2/2018 | Rambo | F02C 7/14 |

* cited by examiner

HYDRAULIC AND PNEUMATIC CONTROL CIRCUIT HAVING A FUEL/AIR HEAT EXCHANGER FOR A TURBOJET

BACKGROUND OF THE INVENTION

The present invention relates to the general field of flows of fuel, oil, and air within a turbojet.

In a turbojet, it is common practice for fuel to be used not only for burning (in the combustion chamber of the turbojet), but also as a hydraulic fluid in hydraulic actuators for controlling variable geometry equipment of the turbojet (such as in particular air bleed valves and valves for adapting the geometry of the compressor of the turbojet).

For this purpose, the fuel circuit of the turbojet typically includes a positive displacement pump for feeding two distinct fuel lines: a first hydraulic line for feeding injector systems for injecting fuel into the combustion chamber; and a second hydraulic line for feeding hydraulic actuators in order to control variable geometry equipment of the turbojet.

The second hydraulic line for feeding control actuators of variable geometry equipment of the turbojet includes electrohydraulic servovalves, i.e. hydraulic valves that are controlled by servo-motors. Such servovalves serve to deliver a calibrated flow of fuel to one or the other of the chambers of a hydraulic actuator, and they are controlled electrically by the electronic control unit (ECU) of the turbojet.

Such electrohydraulic servovalves cannot tolerate the ice that tends to be formed at temperatures below freezing from the water contained in the fuel. In order to avoid ice formation, the fuel circuit makes use of a heat exchanger for heating the fuel flowing in the second hydraulic line by using the hot oil that flows in the lubrication circuit of the turbojet. This heat exchanger typically corresponds to the servo fuel heater (SFH) function of an oil/fuel heat exchanger referred to as the fuel cooled oil cooler (FCOC).

The FCOC heat exchanger also has a main function of transferring heat for the purpose firstly of cooling the oil of the lubrication circuit of the turbojet under hot conditions, and secondly of heating the fuel under cold conditions. This main function, referred to as the main heat exchanger (MHX) function, acts on the fuel upstream from the positive displacement pump of the fuel circuit.

Furthermore, a turbojet includes an oil circuit having the main function of cooling and lubricating elements of the turbojet. For this purpose, the oil circuit uses two cold sources: fuel (by means of the above-described FCOC heat exchanger), and air (by means of an oil/air heat exchanger referred to as an air cooled oil cooler (ACOC)). That architecture for the oil circuit nevertheless presents the drawback that the entire flow of oil passing through the feed pump of the oil circuit passes through the FCOC and ACOC heat exchangers, thereby giving rise to head losses.

Finally, the turbojet also includes an air circuit that serves to feed air to a pneumatic control member for controlling both bleed valves of the high-pressure compressor of the turbojet and also a valve for adjusting clearance at the blade tips of the high-pressure turbine of the turbojet. Typically, that pneumatic control member (also referred to as a pneumatic control unit (PCU)) is controlled electrically by the electronic control unit of the turbojet and contains electrically controlled valves that actuate the above-mentioned valves, which present on/off type operation.

The PCU is fed with air taken from the high-pressure compressor of the turbojet. Given the high temperatures of that air (up to 650° C. under the hottest circumstances), it is necessary to cool the air before it is fed to the electrically controlled valves of the PCU. For this purpose, it is known to provide the air circuit with an air/air heat exchanger that is typically a surface heat exchanger transferring heat from the hot air taken from the high-pressure compressor of the turbojet to the colder air flowing in the secondary passage through the turbojet. That air/air heat exchanger is referred to as a surface air cooled air cooler. Nevertheless, it presents the drawbacks of using the secondary stream through the turbojet as its cold source, thereby generating head losses and degrading the performance of the engine (evaluated at 0.03% of the specific fuel consumption).

Since the amount of heat discharged by new turbojets is becoming ever greater, it has become necessary to optimize as much as possible the management of heat in the fuel, the oil, and the air flowing through the engine so as to enhance cooling of the oil and the specific fuel consumption of the engine.

OBJECT AND SUMMARY OF THE INVENTION

A main object of the present invention is thus to propose optimized management of the heat in the fuel, the oil, and the air flowing in a turbojet.

This object is achieved by a hydraulic and pneumatic control circuit for a turbojet, which circuit comprises a main hydraulic line having an oil/fuel heat exchanger with a function of transferring heat from the oil flowing in an oil circuit of the turbojet to the fuel flowing in the main hydraulic line, a first hydraulic line for feeding fuel to a combustion chamber of the turbojet, a second hydraulic line for feeding fuel to one or more hydraulic actuators for controlling variable geometry equipment of the turbojet, each hydraulic actuator being fed with fuel via an electrohydraulic servovalve, and a pneumatic line for feeding air to a pneumatic control member for bleed valves of a compressor of the turbojet and a blade tip clearance control valve of a turbine of the turbojet, and further comprising a fuel/air heat exchanger positioned on the second hydraulic line upstream from the hydraulic servovalve and on the pneumatic line upstream from the pneumatic control member in order to transfer heat from the air flowing in the pneumatic line to the fuel flowing in the second hydraulic line, and in which the oil/fuel heat exchanger does not have a function of transferring heat between the oil flowing in an oil circuit of the turbojet and the fuel flowing in the second hydraulic line.

In the present invention, the term "hydraulic and pneumatic control circuit" is used to designate the combination of a hydraulic control circuit and a pneumatic control circuit. The hydraulic and pneumatic control circuit is remarkable in particular in that it provides a fuel/air heat exchanger that performs simultaneously the functions both of cooling the air that is to be fed to the pneumatic control member and also of heating the fuel in the second hydraulic line upstream from the electrohydraulic servovalve. Thus, the invention makes it possible to eliminate the servo fuel heater (SFH) function of the FCOC heat exchanger, with this function of heating the fuel flowing in the second hydraulic line being performed by the fuel/air heat exchanger. Eliminating the SFH function thus serves to provide margin in terms of head losses in the oil circuit of the engine and to reduce the space occupied in the engine. The heat exchange capacities of the other heat exchangers of the oil circuit can thus be increased.

Preferably, the pneumatic line further comprises, downstream from the fuel/air heat exchanger, a member for reducing the pressure of engine enclosures for the purpose of adjusting the flow rate of air passing through the fuel/air heat exchanger. This pressure-reducing member may comprise a jet pump, which makes use of a permanent flow for reducing the pressure of the engine enclosures, thus making it easier to determine the design dimensions for the fuel/air heat exchanger.

The first and second hydraulic lines may be connected to each other upstream from the combustion chamber and the hydraulic actuators in order to form the main hydraulic line that includes a positive displacement pump.

Under such circumstances, the main hydraulic line may further comprise a low-pressure pump positioned upstream from the oil/fuel heat exchanger and downstream from a fuel tank.

Furthermore, the air flowing in the pneumatic line is bled from the compressor of the turbojet.

The invention also provides a turbojet including a hydraulic and pneumatic control circuit as defined above.

BRIEF DESCRIPTION OF THE DRAWINGS

Other characteristics and advantages of the present invention appear from the following description made with reference to the accompanying drawings which show an embodiment having no limiting character. In the figures.

DETAILED DESCRIPTION OF THE INVENTION

Figure 1:
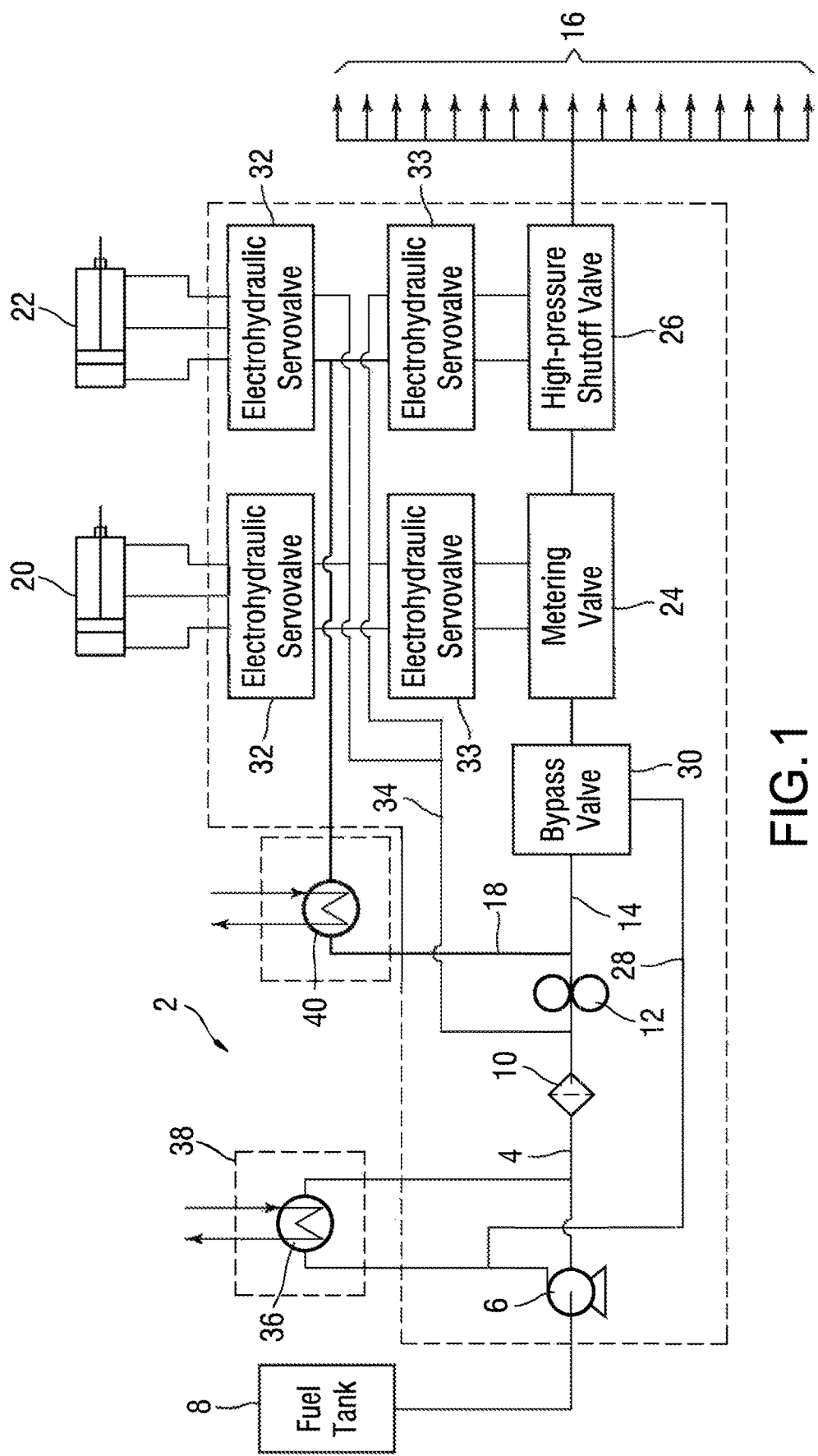
FIG. 1 is a diagrammatic view of a hydraulic control circuit of the invention.

With reference to FIG. 1, there follows a description of the hydraulic control circuit of the invention for a turbojet.

The hydraulic control circuit 2 has includes a main hydraulic line 4. From upstream to downstream in the flow direction of fuel, this control line comprises a low-pressure pump 6 connected upstream to a fuel tank 8, a main fuel filter 10, and a high-pressure positive displacement pump 12.

Downstream from the high-pressure pump 12, the main hydraulic line splits into two distinct fuel lines, namely: a first hydraulic line 14 for feeding fuel to injector systems 16 for injecting fuel into a combustion chamber of the turbojet; and a second hydraulic line 18 for feeding fuel to one or more hydraulic actuators 20, 22 for controlling variable geometry equipment of the turbojet.

More precisely, the first hydraulic line 14 includes a metering member 24 (referred to as a fuel metering valve (FMV)) for controlling the rate at which fuel is injected into the combustion chamber of the turbine engine via the fuel injector systems 16, and a high-pressure shutoff valve (HPSOV) 26 for shutting off the flow of fuel in the event of the turbine engine overspeeding. Each member 24 or 26 is actuated by a dedicated electrohydraulic servovalve (EHSV) 33.

Excess fuel in the first hydraulic line is returned upstream from the main fuel filter 10 via a return loop 28 fed by a bypass valve 30.

The second hydraulic line 18 also includes electrohydraulic servovalves 32, each of which is used for delivering a flow of fuel to one or the other of the chambers of a hydraulic actuator 20, 22.

These servovalves 32 are controlled electrically by the ECU of the turbojet. Such a control unit is itself well known: it serves to control various pieces of equipment that are associated with the turbine engine. The fuel leaving the servovalves 32 returns to the main hydraulic line 4 between the main fuel filter 10 and the high-pressure pump 12 via a return loop 34.

The hydraulic control circuit 2 also includes an oil/fuel heat exchanger 36 (referred to as a fuel cooled oil cooler (FCOC)) that has a main function of transferring heat for the purpose firstly of cooling the oil of the oil circuit of the turbojet under hot conditions, and secondly of heating the fuel under cold conditions.

This main heat transfer function is performed by a fuel/oil heat exchanger 38 interposed in the main hydraulic line 4 between the low-pressure pump 6 and the main fuel filter 10 in order to cool the lubricating oil of the turbojet by exchanging heat with the fuel through a heat exchange surface between those two fluids, thereby having the consequence of heating the fuel and cooling the oil.

It may be observed that in the invention the oil/fuel heat exchanger 36 does not have a servo fuel heater (SFH) function for heating the fuel flowing in the second hydraulic line 18 by means of the hot oil following in the oil circuit of the turbojet (not shown in the figures).

Instead, the hydraulic control circuit 2 of the invention has a fuel/air heat exchanger 40 that is positioned in the second hydraulic line 18 upstream from the electrohydraulic servovalve 32 in order to transfer heat from the air flowing in the pneumatic line (described below) to the fuel flowing in the second hydraulic line.

This fuel/air heat exchanger 40 is a cooler/heater that transfers heat from its hot source (specifically the air feeding this pneumatic control member) to its cold source (specifically the fuel feeding the electrohydraulic servovalves). It is referred to as a fuel cooled air cooler (FCAC).

By way of example, this fuel/air heat exchanger 40 has one portion that is fed with fuel and another portion that is fed with air. Heat may be transferred between the air and the oil via an architecture of "plate" type or else of "tube" type, both of these architectures being well known and depending on the characteristics of the circuits in terms of flow rates and temperatures.

Figure 2:
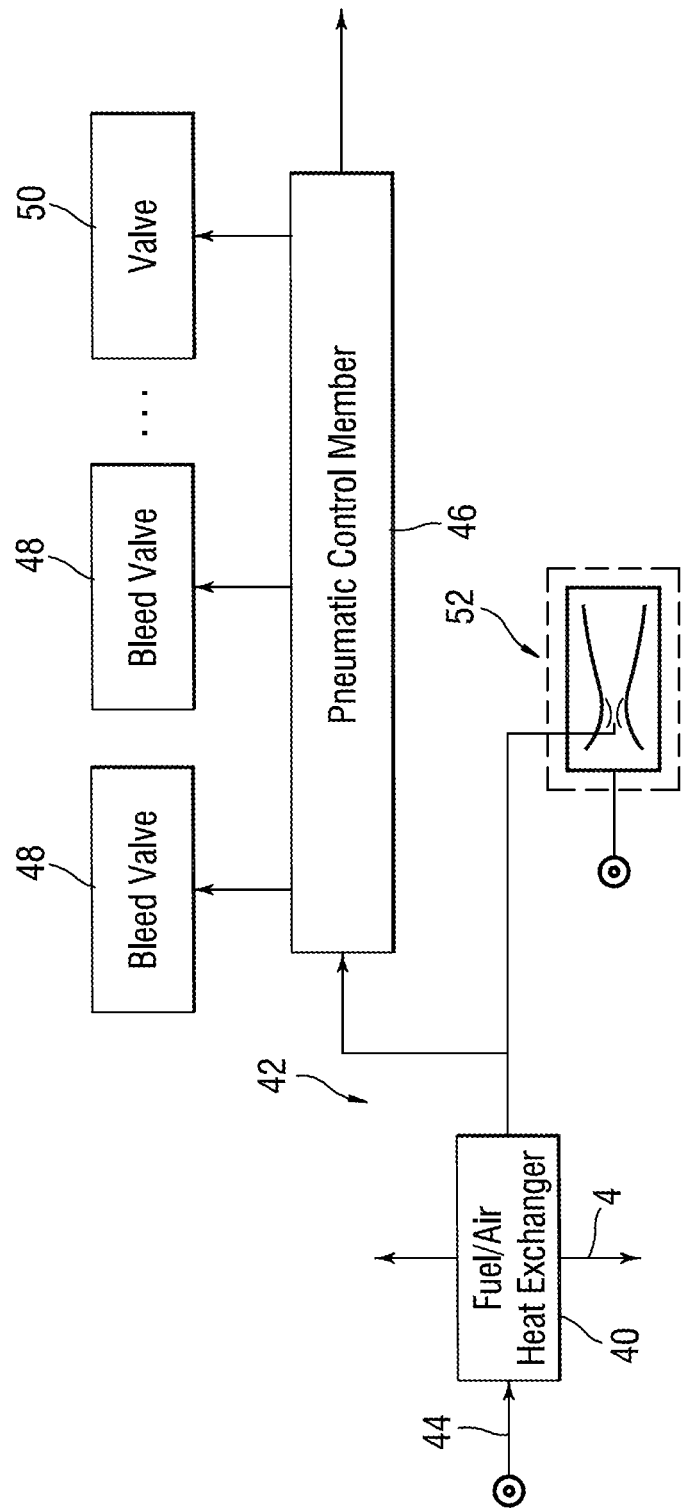
FIG. 2 is a diagrammatic view of a pneumatic control circuit of the invention.

With reference to FIG. 2, there follows a description of the pneumatic control circuit 42 of the turbojet of the invention. The term "hydraulic and pneumatic control circuit" is used to cover the combination of the hydraulic control circuit 2 and the pneumatic control circuit 42.

This pneumatic control circuit 42 comprises in particular a pneumatic line 44 for feeding a pneumatic control member 46 with air, this member serving to control a plurality of bleed valves 48 of a compressor of the turbojet, and a valve 50 for adjusting blade tip clearance of a turbine of the turbojet.

More precisely, the air flowing in the pneumatic line 44 is taken from a stage of the high-pressure compressor of the turbojet.

Furthermore, the pneumatic control member 46 is controlled electrically by the ECU of the turbojet and contains a plurality of electrically controlled valves (not shown), each feeding one of the valves 48, 50, which valves present on/off type operation.

In the invention, the above-described fuel/air heat exchanger 40 is also positioned on the pneumatic line 44 upstream from the pneumatic control member 46. Thus, this fuel/air heat exchanger 40 serves to cool the air taken from the high-pressure compressor of the turbojet before it is fed to the pneumatic control member 46, while also heating the fuel flowing in the second hydraulic line of the hydraulic circuit before it is fed to the electrohydraulic servovalves.

The pneumatic line 44 of the pneumatic circuit preferably also includes, downstream from the fuel/air heat exchanger 40, a member 52 for reducing the pressure of engine enclosures in order to adjust the flow rate of air passing through the fuel/air heat exchanger.

Typically, this pressure-reducing member 52 comprises a jet pump using a permanent flow for reducing the pressure of the engine enclosures, thereby making it easy to determine the design dimensions of the fuel/air heat exchanger.

The oil circuit of the turbojet is not described herein. Typically, such an oil circuit serves mainly to cool and lubricate elements of the turbojet. When implementing the invention, the oil circuit differs from the prior art in that the oil/fuel heat exchanger does not have the SFH function of heating the fuel flowing in the second hydraulic line by means of the hot oil flowing in the oil circuit.

The invention claimed is:

1. A hydraulic and pneumatic control circuit for a turbojet, the hydraulic and pneumatic control circuit comprising:
    a main hydraulic line having an oil/fuel heat exchanger with a function of transferring heat from oil flowing in an oil circuit of the turbojet to fuel flowing in the main hydraulic line;
    a first hydraulic line for feeding the fuel to a combustion chamber of the turbojet;
    a second hydraulic line for feeding the fuel to one or more hydraulic actuators serving to control variable geometry equipment of the turbojet, each hydraulic actuator of the one or more hydraulic actuators being fed with the fuel via an electrohydraulic servovalve;
    a pneumatic line for feeding air to a pneumatic control member for bleed valves of a high pressure compressor of the turbojet and a blade tip clearance control valve of a turbine of the turbojet, the air flowing in the pneumatic line being bled from the high pressure compressor of the turbojet; and
    a fuel/air heat exchanger positioned on the second hydraulic line upstream from the electrohydraulic servovalve and on the pneumatic line upstream from the pneumatic control member in order to transfer heat from the air flowing in the pneumatic line to the fuel flowing in the second hydraulic line,
    wherein the oil/fuel heat exchanger does not have a function of transferring heat between the oil flowing in the oil circuit of the turbojet and the fuel flowing in the second hydraulic line, and
    wherein the pneumatic line further comprises, downstream from the fuel/air heat exchanger, a member for reducing a pressure of engine enclosures for a purpose of adjusting a flow rate of the air passing through the fuel/air heat exchanger, the member and the pneumatic control member being arranged parallel to each other downstream of the fuel/air heat exchanger.

2. The hydraulic and pneumatic circuit according to claim 1, wherein the member for reducing the pressure comprises a jet pump.

3. The hydraulic and pneumatic circuit according to claim 1, wherein the first and second hydraulic lines are connected to each other upstream from the combustion chamber and the one or more hydraulic actuators in order to form the main hydraulic line that also includes a positive displacement pump.

4. The hydraulic and pneumatic circuit according to claim 1, wherein the main hydraulic line further comprises a low-pressure pump positioned upstream from the oil/fuel heat exchanger and downstream from a fuel tank.

5. A turbojet comprising:
    a hydraulic and pneumatic control circuit including
        a main hydraulic line having an oil/fuel heat exchanger with a function of transferring heat from oil flowing in an oil circuit of the turbojet to fuel flowing in the main hydraulic line;
        a first hydraulic line for feeding the fuel to a combustion chamber of the turbojet;
        a second hydraulic line for feeding the fuel to one or more hydraulic actuators serving to control variable geometry equipment of the turbojet, each hydraulic actuator of the one or more hydraulic actuators being fed with the fuel via an electrohydraulic servovalve;
        a pneumatic line for feeding air to a pneumatic control member for bleed valves of a high pressure compressor of the turbojet and a blade tip clearance control valve of a turbine of the turbojet, the air flowing in the pneumatic line being bled from the high pressure compressor of the turbojet, and
        a fuel/air heat exchanger positioned on the second hydraulic line upstream from the electrohydraulic servovalve and on the pneumatic line upstream from the pneumatic control member in order to transfer heat from the air flowing in the pneumatic line to the fuel flowing in the second hydraulic line,
    wherein the oil/fuel heat exchanger does not have a function of transferring heat between the oil flowing in the oil circuit of the turbojet and the fuel flowing in the second hydraulic line, and
    wherein the pneumatic line further comprises, downstream from the fuel/air heat exchanger, a member for reducing a pressure of engine enclosures for a purpose of adjusting a flow rate of the air passing through the fuel/air heat exchanger, the member and the pneumatic control member being arranged parallel to each other downstream of the fuel/air heat exchanger.

\* \* \* \* \*